Sept. 11, 1956 R. J. MEIJER ET AL 2,762,668
HOT-GAS RECIPROCATING APPARATUS
Filed Sept. 10, 1952
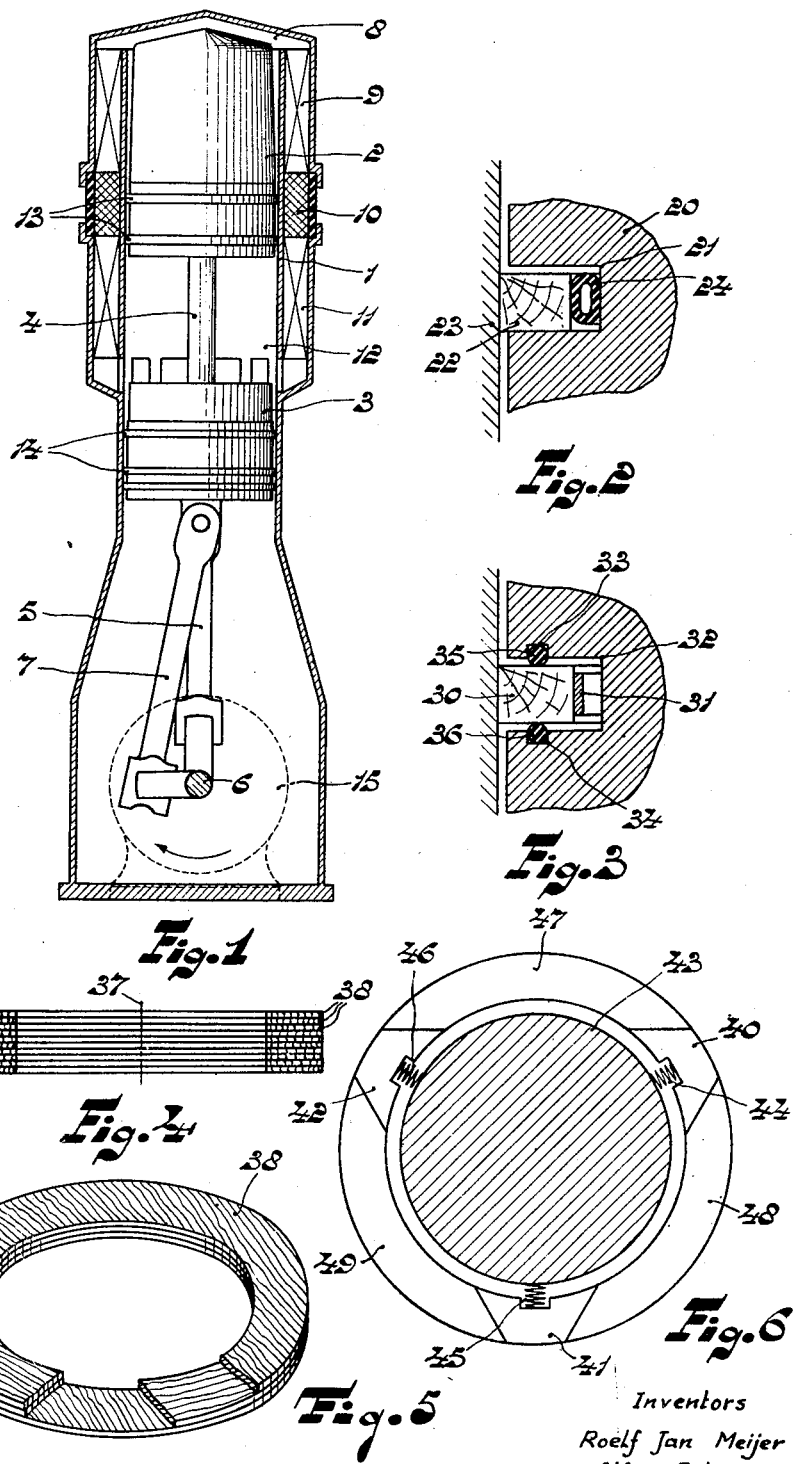
Inventors
Roelf Jan Meijer
Alfons Peters
By Fred M. Vogel
Agent

United States Patent Office 2,762,668
Patented Sept. 11, 1956

2,762,668

HOT-GAS RECIPROCATING APPARATUS

Roelf Jan Meijer, Eindhoven, and Alfons Peters, Amsterdam, Netherlands, assignors to Hartford National Bank and Trust Company, Hartford, Conn., as trustee Application September 10, 1952, Serial No. 308,858

Claims priority, application Netherlands September 14, 1951

3 Claims. (Cl. 309—23)

This invention relates to improvements in or relating to hot-gas reciprocating apparatus. It is known to provide hot-gas reciprocating apparatus with a piston-like member which is guided to perform a rectilinear movement in the working cylinder of the apparatus by means of a bar rigidly secured to said member. This member comprises one or more piston rings. In the present case, the term hot-gas reciprocating apparatus is to be understood to include hot-gas reciprocating engines, cold gas refrigerating apparatus operating according to the reversed hot-gas engine principle, and heat pumps. The aforesaid constructions are used, for example, for the displacer of displacer machines and engines comprising crossheads.

It has hitherto been customary to provide the pistons of said apparatus with a number of metal piston rings. This, however, has a limitation in that the rings require lubrication and, in lubricating cylinder walls and rings, the lubricant may find its way into the work space owing to the reciprocating motion of the piston. Notably in hot-gas piston apparatus this is very disadvantageous, since the lubricant may be carried along with the gases into the work chamber and may deposit in the heat exchangers and in the regenerator. This detracts from the heat transfer to and from the gases, so that the efficiency of the apparatus is also impaired.

In accordance with this invention, applicants have now found that even in high speed engines, having, for example, a speed of 1500 to 2000 revolutions per minute, wooden piston rings may be substituted for metal ones if the transverse forces acting on the contact surfaces of the pistons are not excessively great.

The term "wood" is to be understood to mean the natural product or a product chiefly made from wood or wood fibres.

It has been found that wooden piston rings need not be lubricated, thus precluding the aforesaid lubrication trouble. The wooden rings may either be made in one piece or consist of several segments.

According to the invention, the wood may have a stratified structure. Furthermore, the strata may extend transversely of, preferably at right angles to the center line of the ring, the grain of wood in the strata extending in different directions. Moreover, in accordance with the invention the wood may be compressed.

Since the resiliency of wood is comparatively small the ring would not engage the wall in a sufficiently tight manner so that it should be pressed against the wall by an additional force. To this end, according to one embodiment of the invention, a ring of resilient material is located in the piston slot behind the ring. By this expedient, leakage behind the ring is prevented, or at least greatly reduced.

If the wooden piston rings are used in cold gas refrigerating machines, they are subject to strong contraction, due to which the rings do not fully engage the slots and a pumping effect may take place behind the ring. This pumping effect is avoided if, according to a further embodiment of the invention, sealing means are provided between at least one side of the piston ring and the corresponding side of the slot.

In a further embodiment of the invention, a slot concentric with the contact surface of the piston is preferably provided in at least one side wall of the piston, said slot accommodating a ring of resilient material such that the obturation between the piston ring and the piston member is effected by means of said ring.

In order that the invention may be readily carried into effect, it will now be described in greater detail with reference to the accompanying drawing, given by way of example, in which several embodiments thereof are represented diagrammatically, and in which:

Fig. 1 shows a cold gas refrigerating apparatus comprising a displacer with wooden piston rings.

In Figs. 2 and 3 the piston ring and part of a displacer are shown in fragmentary section on a larger scale.

Fig. 4 is a vertical sectional view of a piston ring, and Fig. 5 is a perspective view partly in section of the ring according to Figure 4.

Fig. 6 is a plan view of a piston ring made up of several segments.

The refrigerating apparatus shown in Fig. 1 comprises a cylinder 1, wherein a displacer 2 and a piston 3 are able to move to and fro with a constant phase difference. The displacer 2 is linked through a connecting rod mechanism 4, 5 to a crank of crank shaft 6, the piston 3 also being coupled through a connecting rod 7 to said crank shaft 6.

The space 8 above the displacer is the freezing chamber of the machine, which chamber connects through a freezer 9, regenerator 10 and cooler 11 with the space 12 between displacer and piston, the last-mentioned space being the so-called cooled space.

The piston rod 4 is rigidly secured to the displacer 2 and is guided to perform a rectilinear movement in the piston 3. In this embodiment no or substantially no transverse forces act on the displacer, so that the displacer may be equipped with wooden piston rings 13. The piston 3 is provided with normal metal piston rings 14, since the transverse forces acting on the contact surface of this piston are considerable. The piston rings in the displacer need not be lubricated so that no additional means are required for conveying the lubricant to the contact surface.

The refrigerating apparatus is driven from an electric motor 15.

Fig. 2 shows on a larger scale part of a cross-section of a displacer. The displacer body 20 is furnished with a piston slot 21 accommodating a wooden piston ring 22 which engages the cylinder wall 23. Since the piston ring 22 itself lacks sufficient resiliency, preferably a rubber ring 24 is provided behind the piston ring, by which rubber ring the piston ring is urged outwards. In the present case the rubber ring is found but it may alternatively have different cross-sections, for example, a rectangular cross-section. The rubber ring also serves to prevent leakage of gas around the inner circumference of the piston ring.

Fig. 3 shows a similar construction, but here a plate spring 31 is provided behind ring 30 so that the latter is urged outwards. The piston slot 32 is provided with slots 33 and 34 accommodating rubber rings 35 and 36. By this construction leakage of the work medium behind the ring is avoided. This embodiment may particularly be used for wooden rings, notably in cold gas refrigerating apparatus, since, owing to considerable contraction of the rings in these apparatus, the rings may loosely engage the piston slots.

Fig. 4 is a vertical sectional view of a piston ring, from which it appears that this ring consists of several layers 38. The layers extend perpendicular to the axis of said piston ring and the grain of wood in the relative layers extend in different directions as is shown in Figure 5.

Fig. 6 shows a subdivided piston ring consisting of six segments, three of which viz. 40, 41, 42, are urged outwards by springs 44, 45 and 46 respectively engaging the wall 43 of the displacer, so that the segments 47, 48 and 49 are also urged outwards. In this manner all the segments will constantly engage the cylinder wall even in the case of wear and all the elements will evenly wear off.

While we have thus described our invention with specific examples and embodiments thereof, other modifications will be readily apparent to those skilled in the art without departing from the spirit and the scope of the invention as defined in the appended claims.

What we claim is:

1. A wooden piston ring for mounting in a peripheral recess of a piston-like member adapted to reciprocate in a cylinder comprising a spring positioned in said recess between said piston-like member and the inner peripheral surface of said piston ring and a pair of resilient rings engaging both said piston-like member and said piston ring and being spaced apart by said piston ring.

2. The combination comprising a piston-like member adapted for reciprocal movement in a cylinder, said piston-like member being provided with a peripheral recess and a pair of oppositely-disposed slots in said piston-like member, a wooden piston ring in said recess, a resilient ring in each of said slots and engaging said piston ring, and a resilient means in said recess urging said piston ring into engagement with said cylinder.

3. The combination as set forth in claim 2 wherein said resilient means is a plate spring.

References Cited in the file of this patent

UNITED STATES PATENTS

| | | |
|---|---|---|
| 301,541 | Weimer | July 8, 1884 |
| 1,355,802 | Williams | Oct. 12, 1920 |
| 1,772,565 | McKone | Aug. 12, 1930 |
| 2,507,177 | Vermeer | May 9, 1950 |
| 2,616,242 | Horowitz | Nov. 4, 1952 |